M. LEWIS.
NUT LOCK.
APPLICATION FILED FEB. 17, 1916.
1,188,187.
Patented June 20, 1916.
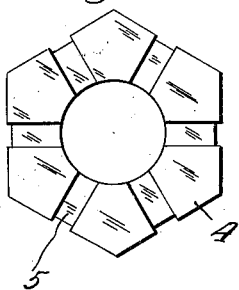
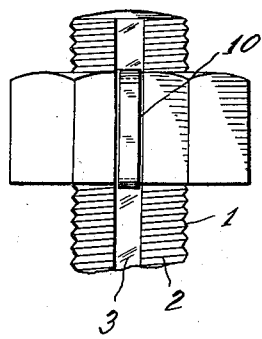
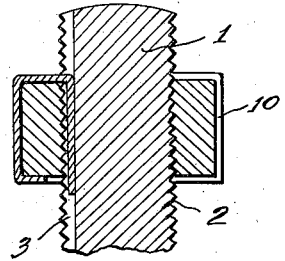
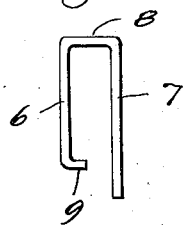
WITNESSES
INVENTOR
Morgon Lewis.
By Max H. Srolong
ATTORNEYS

UNITED STATES PATENT OFFICE.

MORGAN LEWIS, OF WEST ELIZABETH, PENNSYLVANIA, ASSIGNOR OF ONE-FOURTH TO EDWARD P. JONES, ONE-FOURTH TO I. VERIN KEEFER, AND ONE-FOURTH TO RICHARD FORTNER, ALL OF WEST ELIZABETH, PENNSYLVANIA.

NUT-LOCK.

1,188,187.  Specification of Letters Patent.  Patented June 20, 1916.

Application filed February 17, 1916. Serial No. 78,840.

*To all whom it may concern:*

Be it known that I, MORGAN LEWIS, a citizen of the United States, residing at West Elizabeth, in the county of Allegheny and State of Pennsylvania, have invented certain new and useful Improvements in Nut-Locks, of which the following is a specification.

This invention relates to nut locks and has for its object to provide a device of such class, in a manner as hereinafter set forth, with means to prevent the loosening of the nut after the latter has been arranged in clamping position to prevent the screwing of the nut off the bolt after the nut has been mounted to clamp, in connection with the bolt, two or more objects together.

Further objects of the invention are to provide a nut lock which is simple in its construction and arrangement, strong, durable, efficient in its use, conveniently applied, and inexpensive to manufacture.

With the foregoing and other objects in view the invention consists of the novel construction, combination and arrangement of parts as hereinafter more specifically described and illustrated in the accompanying drawing, wherein is shown an embodiment of the invention, but it is to be understood that changes, variations and modifications can be resorted to which come within the scope of the claims hereunto appended.

In the drawings wherein like reference characters denote corresponding parts throughout the several views:—Figure 1 is a plan view of a nut. Fig. 2 is an elevation illustrating the nut lock in accordance with this invention, the bolt being broken away. Fig. 3 is a longitudinal sectional view of a nut lock in accordance with this invention, the bolt being broken away. Fig. 4 is an elevation illustrating the locking member.

Referring to the drawings in detail 1 denotes a shank of a bolt which is peripherally threaded as at 2 and formed with a longitudinally extending groove 3. The length of the groove is equal to the length of the threaded portion of the shank.

The reference character 4 indicates the nut and which has its inner and outer face formed with a series of radially disposed grooves 5 extending from the outer to the inner edge of the nut and the grooves 5 and the outer face of the nut are arranged parallel to the grooves 5 on the inner face of the nut.

Associating with the bolt and nut to prevent rotation of the bolt with respect to the nut, or the nut with respect to the bolt, so that when the nut is arranged in position to clamp loosing or back rotation thereof will be prevented, is a locking member formed of a strip of bendable material, of a width so as to seat in the groove 3 and a groove 5. The said locking member includes a pair of longitudinally extending arms 6, 7, and a pair of radially disposed arms 8, 9. The arm 6 is of a length equal to the thickness of the nut 4 and the arm 7 is of a greater length than the arm 6. The arm 8 connects the arms 6 and 7 together and is of greater length than the arm 9, the latter projecting inwardly at right angles with respect to the inner end of the arm 6.

When the locking member is mounted in position, the arm 7 is seated in the groove 3, the arm 8 in one of the grooves 5 in the inner face of the nut, the arm 6 in the groove 10 formed in the periphery of the nut and the arm 9 in the groove 5 formed in the inner face of the nut.

The periphery or sides of the nut 4 has a series of grooves 10 and the said grooves 10 extend from the grooves 5 on the inner face of the nut and the grooves 5 on the outer face of the nut and when the locking member is arranged in the manner as stated it is set up with respect to the nut and bolt in the manner as illustrated in Fig. 3.

When it is desired to remove the nut, the arm 9 is bent from out of the groove 5, on the inner face of the nut and the locking member can then be slid off which frees the nut.

What I claim is:—

1. A nut lock comprising a bolt having its threaded portion formed with a longitudinally extending groove, a nut having each of its faces formed with a radially extending groove, said grooves arranged in parallelism and of a length to extend from the outer to the inner edge of the nut, said nut further having its side formed with a groove merging at one end in the groove on the inner face of the nut and at its other end in the groove on the outer end of the nut, and a locking member consisting of a pair of longitudinally extending arms, one of greater length than the other, and a pair of radial arms, one of greater length than the other, said longitudinal arms seated in the groove of the bolt and in the groove on the side of the nut and said radial arms seated in the grooves on the faces of the nut.

2. A nut lock comprising a bolt having its threaded portion formed with a longitudinal groove, a nut having each face and its side formed with a series of grooves, the grooves of the side merging in the grooves of the faces of the nut, and a locking member including a pair of longitudinal and a pair of radial arms, said longitudinal arms mounted in the side groove of the nut and in the groove of the bolt and said radial arms mounted in the groove on each face of the nut.

3. A nut lock comprising a bolt having its threaded portion formed with a longitudinal groove, a nut having each face and its side formed with a series of grooves, the grooves of the side merging in the grooves of the faces of the nut, and a locking member including a pair of longitudinal and a pair of radial arms, said longitudinal arms mounted in the side groove of the nut and in the groove of the bolt and said radial arms mounted in the groove on each face of the nut, one of said longitudinal arms of greater length than the other and one of said radial arms of greater length than the other.

In testimony whereof I affix my signature in the presence of two witnesses.

MORGAN LEWIS.

Witnesses:
  VERIN KEEFER,
  RICHARD FORTNER.